(12) United States Patent
Streeter et al.

(10) Patent No.: US 11,371,362 B2
(45) Date of Patent: Jun. 28, 2022

(54) DIFFUSER WITH EXHAUST SHROUD

(71) Applicant: Hamilton Sundstrand Corporation, Charlotte, NC (US)

(72) Inventors: James Streeter, Torrington, CT (US); Darryl A. Colson, West Suffield, CT (US); Roberto J. Perez, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 136 days.

(21) Appl. No.: 16/562,975

(22) Filed: Sep. 6, 2019

(65) Prior Publication Data

US 2021/0071536 A1    Mar. 11, 2021

(51) Int. Cl.
| | |
|---|---|
| *F01D 5/22* | (2006.01) |
| *F01D 5/04* | (2006.01) |
| *F01D 9/04* | (2006.01) |
| *B64D 13/02* | (2006.01) |
| *B64D 13/06* | (2006.01) |
| *F02C 6/08* | (2006.01) |

(52) U.S. Cl.
CPC ............ *F01D 5/225* (2013.01); *B64D 13/02* (2013.01); *F01D 9/04* (2013.01)

(58) Field of Classification Search
CPC . F01D 9/04; F01D 9/065; F01D 5/022; F01D 5/081; F01D 5/34; F01D 5/146; F01D 5/225; F01D 25/30; F01D 11/001; F01D 13/003; F01D 13/02; F04D 29/4206; F04D 19/022; F05D 2220/32; F05D 2260/205; B64D 13/02; B64D 13/06; B64D 2013/0618; F02C 7/18; F02C 6/08; F02C 9/18; F02C 3/073; F02C 9/52
See application file for complete search history.

(56) References Cited

U.S. PATENT DOCUMENTS

| | | | |
|---|---|---|---|
| 2,999,631 | A | 9/1961 | Wollmershauser |
| 7,373,773 | B2 | 5/2008 | Noda |
| 8,616,835 | B2 | 12/2013 | Hashimoto |
| 9,644,494 | B2 | 5/2017 | Hashimoto |
| 2011/0138819 | A1 | 6/2011 | Tanimura |

FOREIGN PATENT DOCUMENTS

| | | |
|---|---|---|
| CH | 215484 A | 6/1941 |
| DE | 1032033 B | 6/1958 |
| EP | 2584169 A2 | 4/2013 |

OTHER PUBLICATIONS

Machine Translation of DE1032033, [Jun. 1958]; [retrieved on Jun. 25, 2021]. Retrieved from: Espacenet. (Year: 2021).*
Machine Translation of CH215484, [Jun. 1941]; [retrieved on Jun. 25, 2021]. Retrieved from: Espacenet. (Year: 2021).*
Extended European Search Report; Application No. 19211768.7; dated Jun. 29, 2020; 10 pages.

* cited by examiner

*Primary Examiner* — Eric J Zamora Alvarez
(74) *Attorney, Agent, or Firm* — Cantor Colburn LLP

(57) ABSTRACT

Disclosed is a pressurization air conditioning arrangement, the arrangement having: a turbine including a housing and a rotor within the housing, wherein the rotor is a dual scroll and including an inner shroud separating a first set of rotor blades from a second set of rotor blades; a diffuser extending from an exhaust of the turbine; and an exhaust shroud within the diffuser, the exhaust shroud dividing the diffuser into an inner diffuser passage and an outer diffuser passage.

10 Claims, 4 Drawing Sheets

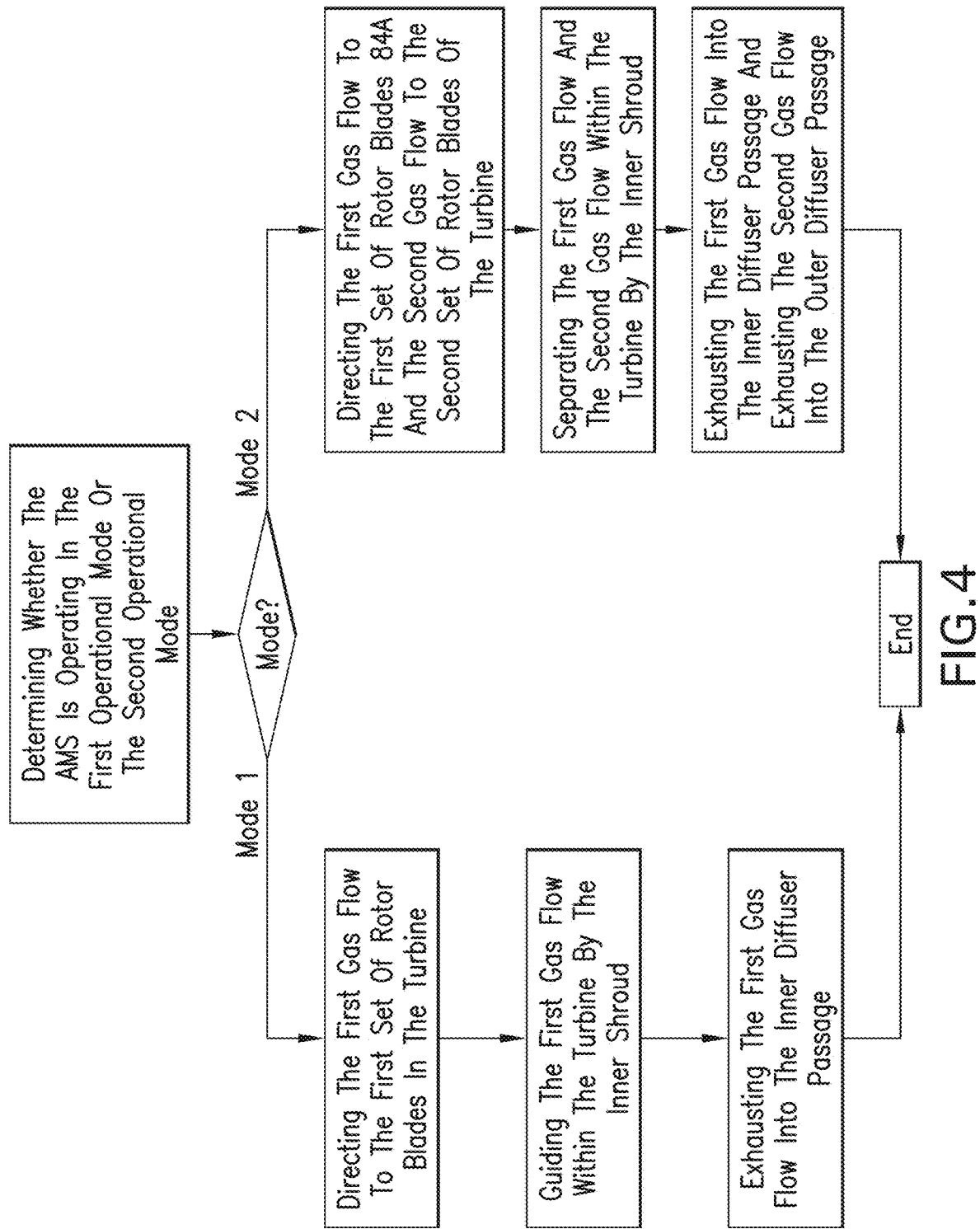

DIFFUSER WITH EXHAUST SHROUD

BACKGROUND

The disclosure is related to a centrifugal turbines and more specifically to a diffuser for a dual passage radial turbine of an air management system, wherein the diffuser includes an exhaust shroud.

An air management system (AMS) of an aircraft may include a pressurization air conditioning arrangement. The arrangement receives bleed air from a compressor of a gas turbine engine. The arrangement may include a turbine. The turbine may be a centrifugal turbine. Energy from the bleed air is removed by the turbine to drive the arrangement. From this, the AMS is able to condition the bleed air. The conditioned bleed air is directed to, for example, the aircraft cabin and aircraft electronics.

SUMMARY

Disclosed is a pressurization air conditioning arrangement, the arrangement comprising: a turbine including a housing and a rotor within the housing, wherein the rotor is a dual scroll and including an inner shroud separating a first set of rotor blades from a second set of rotor blades; a diffuser extending from an exhaust of the turbine; and an exhaust shroud within the diffuser, the exhaust shroud dividing the diffuser into an inner diffuser passage and an outer diffuser passage.

In addition to one or more of the above disclosed aspects or as an alternate the exhaust shroud is radially level with the inner shroud of the rotor at an exhaust of a turbine housing.

In addition to one or more of the above disclosed aspects or as an alternate the exhaust shroud has a conical profile.

In addition to one or more of the above disclosed aspects or as an alternate the system includes one or more struts extending between the diffuser and the exhaust shroud.

In addition to one or more of the above disclosed aspects or as an alternate each of the one or more struts has a same height in a radial direction.

In addition to one or more of the above disclosed aspects or as an alternate the diffuser and the exhaust shroud are formed as a unitary structure.

In addition to one or more of the above disclosed aspects or as an alternate: the first set of rotor blades is configured to receive a first gas flow; the second set of rotor blades is configured to receive a second gas flow; the first gas flow and the second gas flow are separated in the turbine by the inner shroud of the rotor; and the first gas flow and the second gas flow are separated in the diffuser by the exhaust shroud of the diffuser.

In addition to one or more of the above disclosed aspects or as an alternate when the first set of rotor blades receives the first gas flow, the exhaust shroud prevents the first gas flow from expanding into the outer diffuser passage.

Further disclosed is an air management system for an aircraft, comprising: a pressurization air conditioning arrangement, including an input to receive one or both bleed/fresh air and provide air to a cabin the arrangement including: a turbine; a rotor within the turbine, the rotor being a dual-scroll rotor and including an inner shroud separating a first set of rotor blades from a second set of rotor blades; a diffuser extending from an exhaust of the turbine; and an exhaust shroud within the diffuser, the exhaust shroud dividing the diffuser into an inner diffuser passage and an outer diffuser passage.

In addition to one or more of the above disclosed aspects or as an alternate the first gas flow is bleed air from an engine and the second gas flow is ram air.

Further disclosed is an aircraft comprising an air management system having one or more of the above disclosed features.

Further disclosed is a method of directing flows through a turbine of an air management system for an aircraft, the method comprising: directing a first gas flow to a first set of rotor blades of the turbine and a second gas flow to a second set of rotor blades of the turbine; separating the first gas flow and the second gas flow within the turbine by an inner shroud; exhausting the first gas flow into an inner diffuser passage and the second gas flow into an outer diffuser passage formed by an exhaust shroud extending through a diffuser from the inner shroud of the rotor.

In addition to one or more of the above disclosed aspects or as an alternate, in another mode of operation, the method consists of: directing the first gas flow to the first set of rotor blades of the turbine; directing the first gas flow within the turbine by an inner shroud of a rotor; exhausting the first gas flow into the inner diffuser passage.

BRIEF DESCRIPTION OF THE FIGURES

The following descriptions should not be considered limiting in any way. With reference to the accompanying drawings, like elements are numbered alike:

FIG. 4 is a flowchart illustrating a method of directing flow utilizing an air management system according to disclosed embodiments.

DETAILED DESCRIPTION

Figure 1:
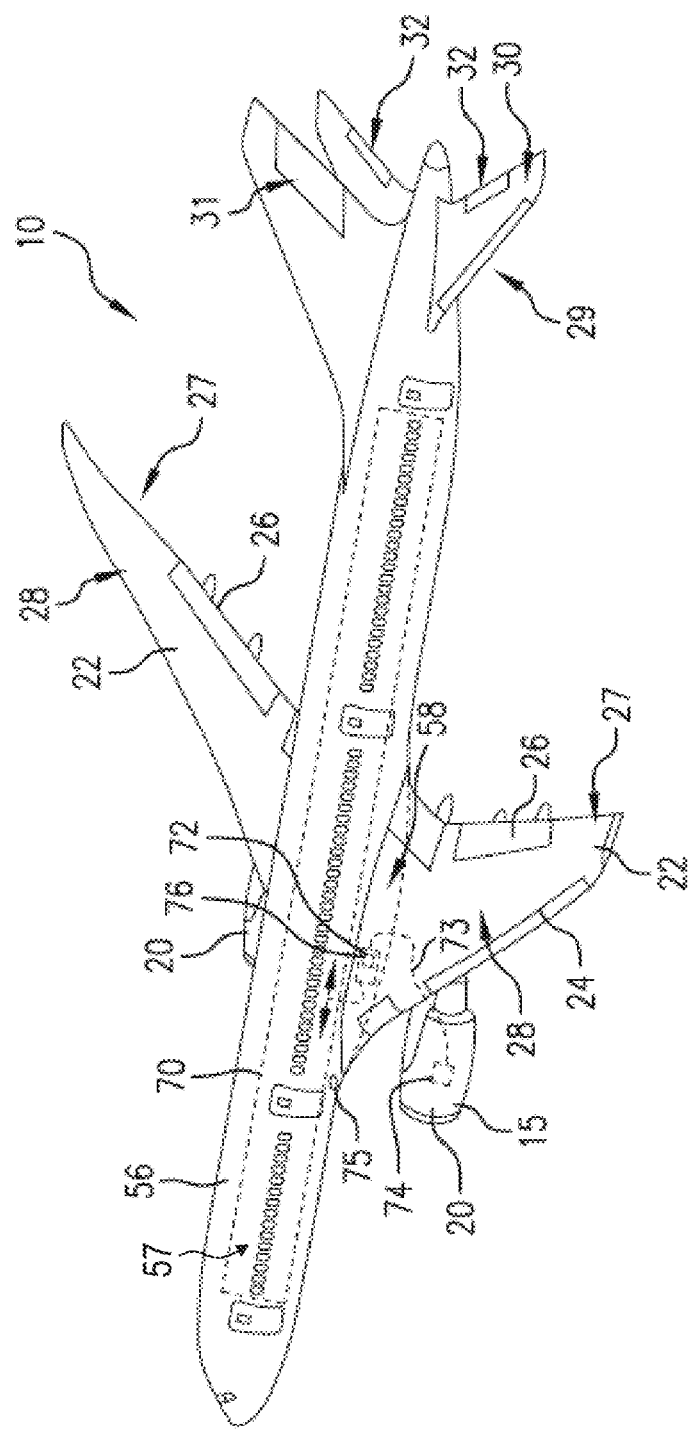
FIG. 1 is a perspective view of an aircraft where the disclosed embodiments may be implemented.

FIG. 1 illustrates an example of a commercial aircraft (aircraft) 10 having a gas turbine engine (engine) 15, illustrated schematically. The engine 15 may be surrounded by (or otherwise carried in) a nacelle 20. The aircraft 10 includes a fuselage 56 with a cabin 57 therein (illustrated schematically). Two wings 22 are connected to the fuselage 56 though a wing-to-body fairing (fairing) 58. The two wings 22 can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable under aircraft power systems.

The aircraft 10 is equipped with an air management system (AMS) 70 illustrated schematically. The AMS 70 includes at least one Pressurization Air Conditioning arrangement 72. As illustrated, the arrangement 72 is located in the fairing 58 between the two wings 22 beneath the fuselage 56. Or course, this is not meant as limiting. Air supplied to an input 73, which may be an input conduit, of the arrangement 72 is bled from a compressor 74 (illustrated schematically) of the engine 15. As further discussed below, the arrangement 72 may receive ram air from a ram air intake 75. The arrangement 72 includes a turbine 76 illustrated schematically in FIG. 1.

Figure 2:
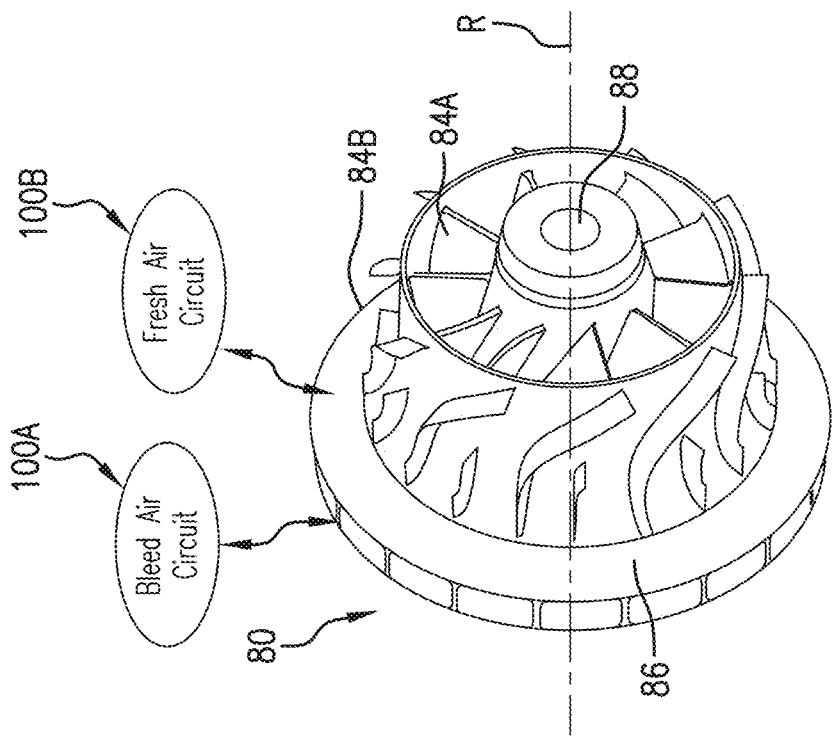
FIG. 2 is a perspective view of a rotor which can be utilized in an air management system according to disclosed embodiments.

Turning to FIG. 2, a rotor 80 utilized in the turbine 76 is shown. The rotor 80 is a dual-scroll rotor. The rotor 80 has two sets of rotor blades generally referred to as 84. An inner shroud 86 separates a first set of rotor blades 84A from a second set of rotor blades 84B. When in a housing 87 (FIG. 3A), the housing 87 and shroud 86 together form an inner turbine passage about the first set of rotor blades 84A and an outer turbine passage about the second set of rotor blades 84B. The rotor 80 is a unitary structure having a shaft through-hole 88 along a radial center R. The rotor 80 is configured to receive as working fluid bleed air 100A and fresh air 100B as discussed in greater detail with FIGS. 3A and 3B.

Figure 3A:
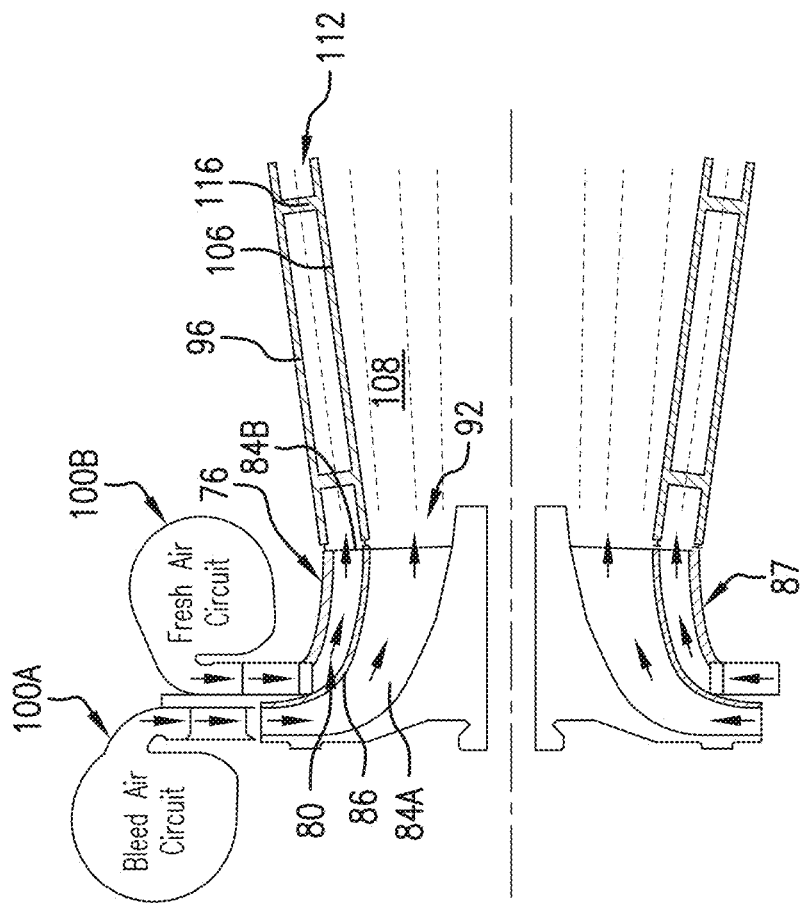
FIGS. 3A-3B show a turbine and diffuser configuration which can be utilized in an air management system according to disclosed embodiments.
Figure 3B:
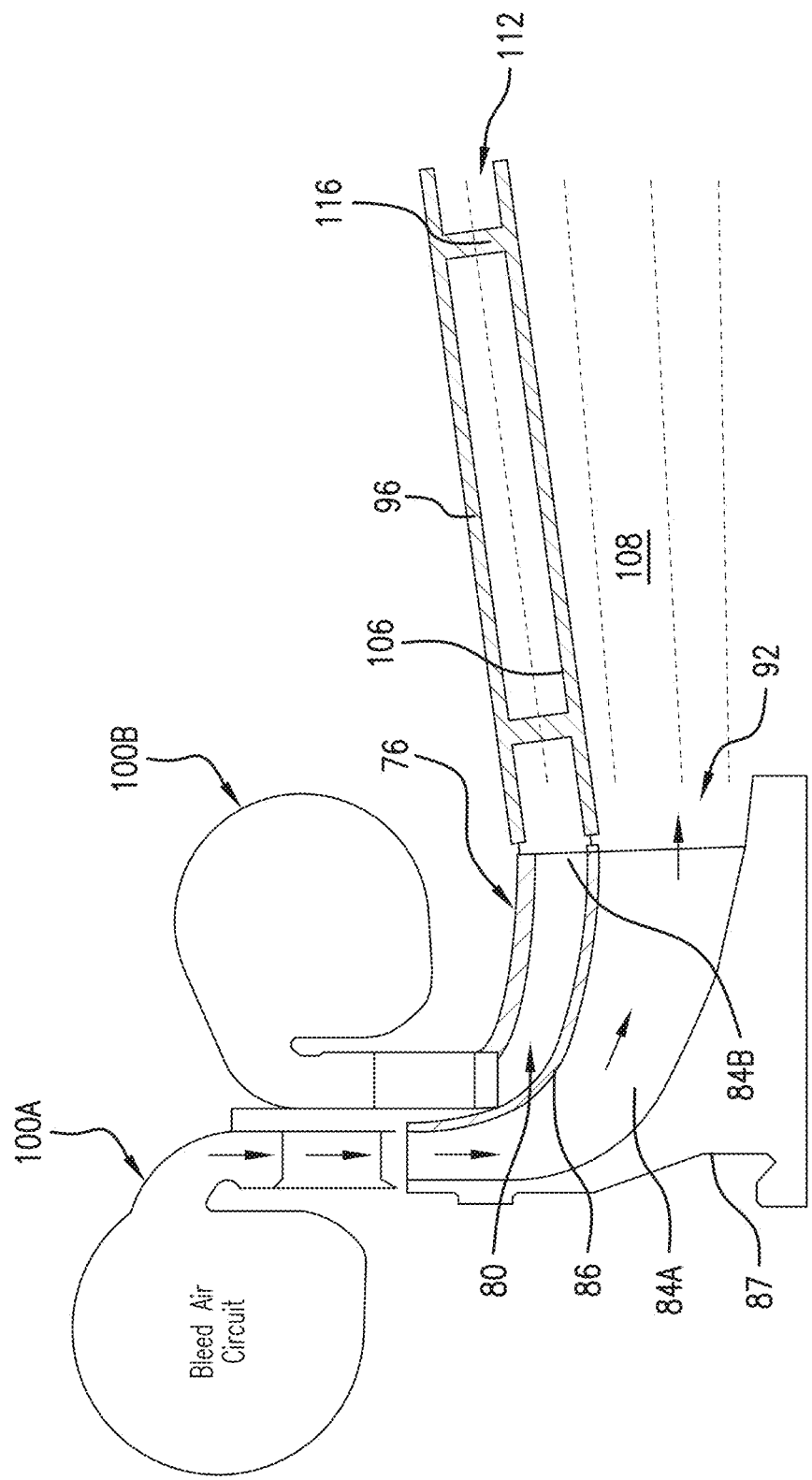

Turning to FIGS. 3A and 3B, show cross-sections of a turbine 76 connected to a diffuser 96 in two operational modes. The turbine 76 can include the rotor 80 surrounded by a turbine housing 87. The turbine 76, with the rotor 80 forms a centrifugal radial-inflow dual-scroll. The turbine housing 87 includes an exhaust 92 spanning the outputs of both sets of blades of the rotor 80. The exhaust 92 of the turbine 76 is shrouded by a diffuser 96. The diffuser 96 may be conical.

The turbine 76 receives a first gas flow 100A bleed air from the engine 15. The first gas flow 100A is directed to the first set of rotor blades 84A. The turbine 76 also receives a second gas flow 100B from, for example, a fresh air circuit. The fresh air circuit may provide ram air through a ram air intake of the aircraft 10, but other sources or fresh air from outside the aircraft.

The diffuser includes a diffuser inner diffuser passage 108 and an outer diffuser passage 112. The two passages are separated by an exhaust shroud 106 radially inward from an outer shell 107 of the diffuser 96. The exhaust shroud 106 is radially level with the inner shroud of the rotor 80 at the exhaust 92 of the turbine housing 87. The exhaust shroud 106 divides the diffuser 96 into the inner diffuser passage 108 and the outer diffuser passage 112. 106

One or more support struts (struts) 116 may extend between the exhaust shroud 106 and the diffuser 96 as support. The exhaust shroud 106 may have a conical profile that increases away from the turbine 76. The increase in the conical profile may match that of the diffuser 96. Under such configuration each of the struts 116 may have a same size, for example in a radial direction, defining a height of the struts 116. The exhaust shroud 106 may be the same length as the diffuser 96. The exhaust shroud 106 may be the same material as the diffuser 96. In one embodiment the exhaust shroud 106 is manufactured as an integral part of the diffuser 96.

The AMS 70 may operate in a plurality of modes depending on needs of the aircraft 10. The first mode of operation is illustrated in FIG. 3A. Under a first mode of operation, the turbine 76 may receive only the first gas flow 100A. The second mode of operation is illustrated in FIG. 3B. Under the second mode of operation, the turbine 76 may receive the first gas flow 100A and the second gas flow 100B.

Without the exhaust shroud 106 if the diffuser 96, during the first mode of operation of the AMS 70, there is a sudden expansion of air leaving the turbine 76 at the exhaust 92 of the turbine 76. This expansion leads to operational inefficiencies, including diffuser stall. The exhaust shroud 106 prevents the sudden explanation at the exhaust 92 of the turbine 76. As illustrated in FIG. 3B, exhaust from the first set of rotor blades 84A is able to smoothly transition from the turbine 76 into the diffuser 96. This results in a more efficient utilization of the turbine 76 and thus a more efficient operation of the AMS 70. In turn, this results in more efficient use of bleed air from the engine 15, and therefore a more efficient use of the engine 15.

Turning to FIG. 4, a flowchart shows a method of directing flows through a turbine 76 of an air conditioning arrangement 72 which is part of an AMS 70 of an aircraft 10. As illustrated in block 510, the method includes determining whether the AMS 70 is operating in the first operational mode or the second operational mode. As indicated, the first operational mode is a single flow operational mode. In the first operational mode the first gas flow 100A is directed to the turbine 76. In the second operational mode the first gas flow 100A and the second gas flow 100B are directed to the turbine 76.

If the flow is the first operational mode (Mode 1 at block 520) then as illustrated in block 530, the method includes directing the first gas flow 100A to the first set of rotor blades 84A of the turbine 76. As illustrated in block 540, the method includes directing the first gas flow 100A within the turbine 76 by the inner shroud 86. As illustrated in block 550, the method includes exhausting the first gas flow 100A into the inner diffuser passage 108. As indicated the inner diffuser passage 108 is one of a plurality of diffuser passages including the inner diffuser passage and an outer diffuser passage is formed by the exhaust shroud 106 of the diffuser 96 extending from the inner shroud 86 of the turbine 76.

If the flow is the second operational mode (Mode 2 at block 520) then as illustrated in block 560, the method includes directing the first gas flow 100A to the first set of rotor blades 84A and the second gas flow 100B to the second set of rotor blades 84B of the turbine 76. As illustrated in block 570, the method includes separating the first gas flow 100A and the second gas flow 100B within the turbine 76 by the inner shroud 86. As illustrated in block 580, the method includes exhausting the first gas flow 100A into the inner diffuser passage 108 and the second gas flow 100B into the outer diffuser passage 112.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A pressurization air conditioning arrangement comprising:
- a turbine including a housing and a rotor within the housing, wherein the rotor is dual scroll and includes an inner shroud separating a first set of rotor blades from a second set of rotor blades;
- a diffuser having a conical shape and extending from an exhaust of the turbine; and
- an exhaust shroud radially inward of an outer shell of the diffuser, the exhaust shroud having a conical profile and a same length as the diffuser and dividing the diffuser into an inner diffuser passage and an outer diffuser passage, wherein the exhaust shroud is radially aligned with the inner shroud of the rotor at the exhaust of the turbine; and
- a plurality of struts spaced apart from each other along the exhaust shroud and extending between the outer shell of the diffuser and the exhaust shroud, and wherein each strut of the plurally of struts has having a same height in a radial direction.

2. The arrangement of claim 1, wherein the diffuser and the exhaust shroud are formed as a unitary structure.

3. The arrangement of claim 1, wherein:
- the first set of rotor blades is configured to receive a first gas flow;
- the second set of rotor blades is configured to receive a second gas flow;
- the first gas flow and the second gas flow are separated in the turbine by the inner shroud of the rotor; and
- the first gas flow and the second gas flow are separated in the diffuser by the exhaust shroud of the diffuser.

4. The arrangement of claim 3, wherein when the first set of rotor blades receives the first gas flow, the exhaust shroud prevents the first gas flow from expanding into the outer diffuser passage.

5. An air management system for an aircraft, comprising:
- a pressurization air conditioning arrangement, including an input to receive one or both of bleed air and fresh air and wherein the arrangement provides the one or both of bleed air and fresh air to a cabin, the arrangement including:
- a turbine;
- a rotor within the turbine, the rotor being a dual-scroll rotor and including an inner shroud separating a first set of rotor blades from a second set of rotor blades;
- a diffuser having a conical shape and extending from an exhaust of the turbine; and
- an exhaust shroud radially inward of an outer shell of the diffuser, the exhaust shroud having a conical profile and a same length as the diffuser and dividing the diffuser into an inner diffuser passage and an outer diffuser passage, wherein the exhaust shroud is radially aligned with the inner shroud of the rotor at the exhaust of the turbine; and
- a plurality of struts spaced apart from each other along the exhaust shroud and extending between the outer shell of the diffuser and the exhaust shroud, and wherein each strut of the plurally of struts has a same height in a radial direction.

6. The system of claim 5, wherein the diffuser and the exhaust shroud are formed as a unitary structure.

7. The system of claim 5, wherein:
- the first set of rotor blades is configured to receive a first gas flow;
- the second set of rotor blades is configured to receive a second gas flow;
- the first gas flow and the second gas flow are separated in the turbine by the inner shroud of the rotor; and
- the first gas flow and the second gas flow are separated in the diffuser by the exhaust shroud of the diffuser.

8. The system of claim 7, wherein when the first set of rotor blades receives the first gas flow, the exhaust shroud prevents the first gas flow from expanding into the outer diffuser passage.

9. The system of claim 7, wherein the first gas flow is bleed air from an engine and the second gas flow is fresh air.

10. An aircraft comprising the air management system of claim 5.

* * * * *